Aug. 28, 1934.   J. FRASER   1,972,014
SPRING ASSEMBLY FOR VEHICLE CHASSIS
Filed Oct. 28, 1933
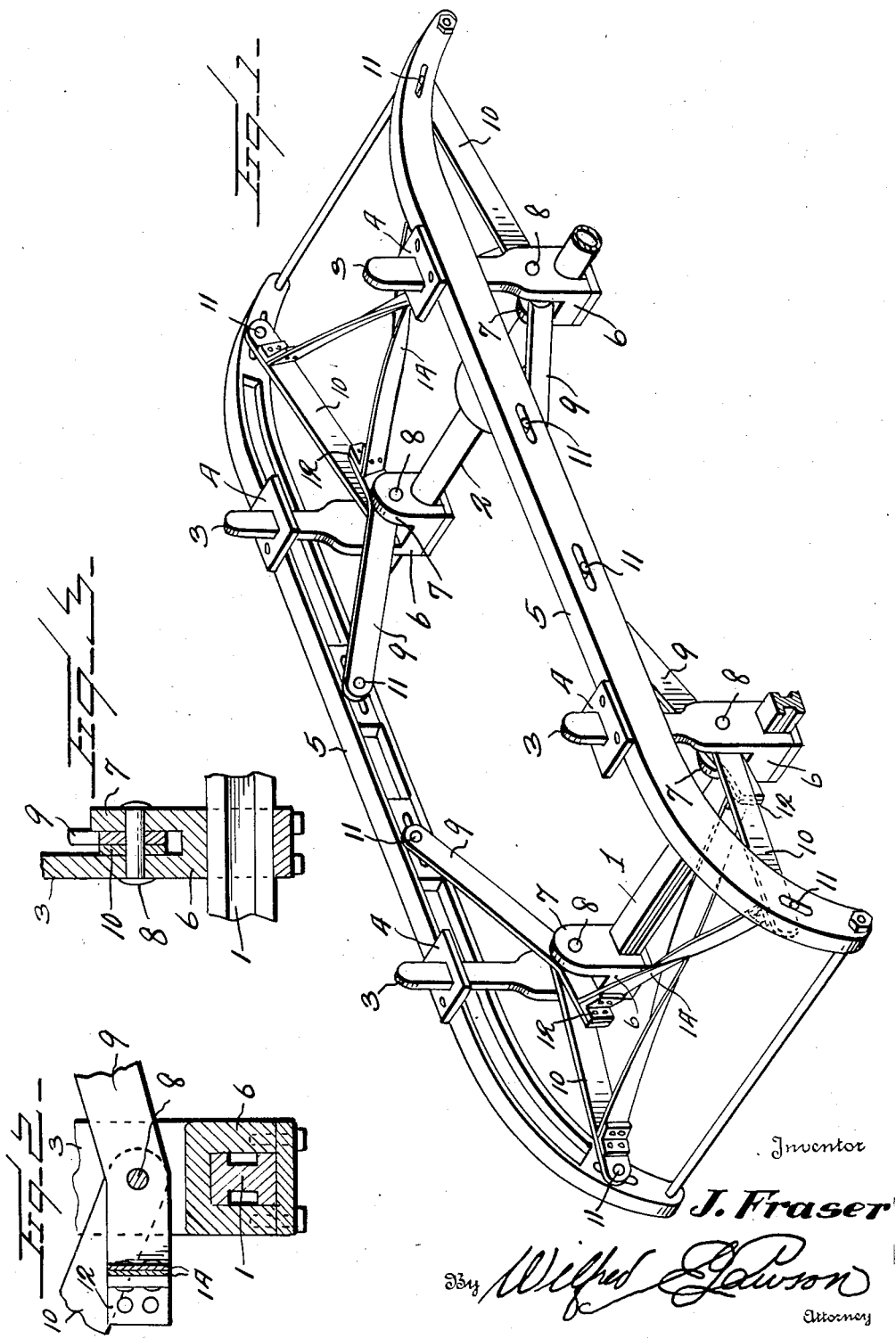
Inventor
J. Fraser
By Wilfred Lawson
Attorney

UNITED STATES PATENT OFFICE 1,972,014

SPRING ASSEMBLY FOR VEHICLE CHASSIS

John Fraser, Brooklyn, N. Y.

Application October 28, 1933, Serial No. 695,680

9 Claims. (Cl. 267—57)

This invention relates to a spring assembly for vehicle chassis, and it is an object of the invention to provide an assembly of this kind constructed and arranged in a manner to exert force in opposite directions to maintain the chassis in suspension and to urge the wheels of the vehicle toward the roadway or other supporting surface.

Another object of the invention is to provide an assembly to be interposed between a vehicle chassis and an underlying axle or the like, said assembly comprising a series of levers in desired operative connection with the axle and chassis together with torsion members operatively engaged with the levers.

The invention consists in the details of construction and in the combination and arrangement of the several parts of my improved spring assembly for vehicle chassis whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in perspective illustrating spring assemblies constructed in accordance with an embodiment of my invention;

Figure 2 is a fragmentary view partly in section and partly in elevation illustrating certain details of construction as herein employed;

Figure 3 is a view partly in front elevation and partly in section of the structure as illustrated in Figure 2.

As disclosed in the accompanying drawing, the front axle 1 and the rear axle 2 each have associated therewith a spring assembly constructed in accordance with an embodiment of my invention. While the rear axle 2 constitutes a conventional type of housing yet it is to be understood that in hereinafter referring in the description and claims to an axle the same is intended to cover a housing or any other kindred member.

Each of the spring assemblies as herein disclosed comprises vertically disposed members or standards 3 having their upper end portions slidably disposed through the inwardly directed plates 4 rigidly carried at desired points by the side members 5 of the chassis. The lower end portion of each of the members 3 carries a laterally disposed block 6 which, as herein disclosed, straddles from above an axle 1 and is suitably clamped or anchored thereto. The means for clamping or holding the block 6 to an axle may be as desired and, therefore, the detailed disclosure of any such means is not believed to be necessary other than to state that the member 3 is rigidly held in a vertical position when mounted upon an axle.

As herein disclosed, in the mounting of the assembly each of the blocks 6 extends inwardly from the lower end portion of a member 3 and is provided at its inner end with an upstanding lug 7 between which are pivotally held by a pin 8 the overlapping end portions of the oppositely directed levers 9 and 10. These levers 9 and 10 extend upwardly fore and aft of the associated member 3 and have their free end portions operatively engaged, as at 11, with the side members 5 of the chassis whereby relative up and down movement may be had by the chassis 5 and the axles 1. The members 3, however, at all times maintain the axles 1 and the members 5 of the chassis in desired effective relation.

The pivoted end portions of the levers 9 are continued by the extensions 12 and to the outer portion of each of these extensions 12 is secured an extremity of a flat spring 14 the end edge of which being substantially vertically disposed. This spring is turned or twisted for 180° and the opposite end thereof is secured to the outer end portion of the associated lever 10. This end edge of the spring 14 is also substantially vertically disposed. While in the drawing each of the springs 14 is shown of one piece it is to be stated that the same may, if desired, be laminated. It is also to be stated that a spring 14 is not to be turned or twisted more than 180°.

The tension of the applied springs 14 as resisted by the chassis and the load thereon results in the axles 1 being constantly urged downwardly to assure the wheels of the vehicle being held to the ground while at the same time the chassis and load thereon is maintained in desired suspension.

When the vehicle is in transit the springs 14 together with the movements of the levers 9 and 10 operate to effectively absorb the shocks and jars incident to transit and it is to be stated that each spring assembly is effective upon direct contact of both wheels of an axle 1 or upon undue resistance being offered to only a single wheel.

My improved spring assembly assures a maximum of comfort in travel when employed in connection with a passenger vehicle and it is also of importance when used in connection with freight bodies and more especially in the transporting of fragile merchandise in view of the fact that with the use of my improved spring assembly the vehicle chassis and load thereon is subjected to a minimum of vibration.

From the foregoing description it is thought to be obvious that a spring assembly for vehicle chassis constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A spring assembly to be interposed between an axle and a body comprising links operatively engaged with the body and the axle, said links being arranged in pairs and the links of each pair being oppositely disposed one with respect to the other, a torsion bar connected to each link of one pair adjacent an end thereof and with an end portion of the oppositely disposed link of a second pair of links.

2. A spring assembly to be interposed between an axle and a body comprising links operatively engaged with the body and the axle, said links being arranged in pairs and the links of each pair being oppositely disposed one with respect to the other, a torsion bar connected to each link of one pair adjacent an end thereof and with an end portion of the oppositely disposed link of a second pair, said torsion bar comprising a flat spring turned on a spiral.

3. A spring assembly to be interposed between an axle and a body comprising links operatively engaged with the body and the axle, said links being arranged in pairs and the links of each pair being oppositely disposed one with respect to the other, a torsion bar connected to each link of one pair adjacent an end thereof and with an end portion of the oppositely disposed link of a second pair, said torsion bar comprising a flat spring turned on a spiral, the extremities of the spring secured to the links being substantially vertically disposed.

4. A spring assembly adapted to be interposed between two members, said assembly including two pairs of links, means for pivotally connecting the links of each pair to each other and to one of the members, said links being oppositely disposed with respect to their pivotal connection and having their outer extremities operatively engaged with the second member, and a torsion member secured to one link of each pair adjacent its pivotal connection and with the outer end portion of the oppositely disposed link of the second pair of links.

5. In combination with two members adapted to have movement one toward and from the other, a spring assembly interposed between said members and comprising vertically disposed standards secured to one of said members and slidably engaged with the other member, oppositely disposed links pivotally connected to each of the standards and having their outer end portions operatively engaged with the second member, and a torsion member connecting one link of one standard with an oppositely directed link of a second standard.

6. In combination with two members adapted to have vertical movement one toward or from the other, a spring assembly interposed between said members and comprising standards secured to one of said members and slidably engaged with the other member, a pair of oppositely directed links having end portions pivotally connected with each of the standards and their opposite end portions operatively engaged with the second member, the pivoted end portion of one link of each pair of links being continued by an extension and a torsion member secured to the extension and to the link of the second standard free of an extension.

7. In combination with two members adapted to have movement toward and from each other, a spring assembly interposed between said members and comprising two pairs of links, the links of each pair being oppositely directed, means for pivotally connecting adjacent end portions of the links to one member, means for operatively connecting the links to the second member, one of the links of each pair being continued at its pivoted end with an extension, and a torsion member secured to the extension of one link of each pair and to the link of the second pair at the same side of its pivot as the extension of the link of the first pair.

8. In combination with two members adapted to have movement toward and from each other, a spring assembly interposed between said members and comprising two pairs of links, the links of each pair being oppositely directed, means for pivotally connecting adjacent end portions of the links to one member, means for operatively connecting the links to the second member, one of the links of each pair being continued at its pivoted end with an extension, and a torsion member secured to the extension of one link of each pair and to the link of the second pair at the same side of its pivot as the extension of the link of the first pair, each of said torsion members being flat.

9. In combination with two members adapted to have movement toward and from each other, a spring assembly interposed between said members and comprising two pairs of links, the links of each pair being oppositely directed, means for pivotally connecting adjacent end portions of the links to one member, means for operatively connecting the links to the second member, one of the links of each pair being continued at its pivoted end with an extension, and a torsion member secured to the extension of one link of each pair and to the link of the second pair at the same side of its pivot as the extension of the link of the first pair, each of said torsion members being flat and turned on a spiral.

JOHN FRASER.